(12) United States Patent  (10) Patent No.: US 8,531,912 B2
Soubaras  (45) Date of Patent: Sep. 10, 2013

(54) METHOD AND DEVICE TO ACQUIRE MARINE SEISMIC DATA

(75) Inventor: Robert Soubaras, Orsay (FR)

(73) Assignee: Cggveritas Services SA, Massy Cedex (FR)

( * ) Notice: Subject to any disclaimer, the term of this patent is extended or adjusted under 35 U.S.C. 154(b) by 0 days.

(21) Appl. No.: 13/471,561

(22) Filed: May 15, 2012

(65) Prior Publication Data

US 2012/0224454 A1  Sep. 6, 2012

Related U.S. Application Data

(63) Continuation of application No. PCT/EP2011/050480, filed on Jan. 14, 2011.

(30) Foreign Application Priority Data

Jan. 15, 2010 (FR) ................................. 10 50276

(51) Int. Cl.
*G01V 1/38* (2006.01)

(52) U.S. Cl.
USPC ................... 367/16; 367/15; 367/17; 367/20

(58) Field of Classification Search
USPC ................... 181/110; 367/16, 19, 21, 24, 48, 367/57, 59, 129, 130
See application file for complete search history.

(56) References Cited

U.S. PATENT DOCUMENTS

| | | |
|---|---|---|
| 2,614,165 A | 10/1952 | Doolittle |
| 3,299,399 A | 1/1967 | Bowers |
| 3,491,848 A | 1/1970 | Giles |
| 3,885,515 A | 5/1975 | Caldwell, Jr. et al. |
| 4,068,208 A | 1/1978 | Rice, Jr. et al. |
| 4,101,866 A | 7/1978 | Ruele |
| 4,233,677 A | 11/1980 | Brown et al. |
| 4,254,480 A | 3/1981 | French |
| 4,353,121 A | 10/1982 | Ray et al. |
| 4,404,664 A | 9/1983 | Zachariadis |
| 4,486,863 A | 12/1984 | French |
| 4,486,865 A | 12/1984 | Ruehle |
| 4,532,617 A | 7/1985 | Baecker et al. |
| 4,581,723 A | 4/1986 | Savit |
| 4,635,236 A | 1/1987 | Roberts |
| 4,872,144 A | 10/1989 | Young et al. |
| 4,884,249 A | 11/1989 | Snook |

(Continued)

FOREIGN PATENT DOCUMENTS

| | | |
|---|---|---|
| EP | 0365270 A2 | 4/1990 |
| EP | 1426786 A1 | 6/2004 |

(Continued)

OTHER PUBLICATIONS

US 6,456,564, 09/2002, Grall et al. (withdrawn).

(Continued)

*Primary Examiner* — Isam Alsomiri
*Assistant Examiner* — Daniel L Murphy
(74) *Attorney, Agent, or Firm* — Patent Portfolio Builders PLLC (57) ABSTRACT

The invention concerns a method to acquire seismic waves by means of a streamer towed by a vessel and comprising a plurality of seismic receivers. The streamer comprises a head portion that is slanted relative to the water surface and a tail portion having at least one section with a different slant.

16 Claims, 6 Drawing Sheets

(56) References Cited

U.S. PATENT DOCUMENTS

| | | | |
|---|---|---|---|
| 4,979,150 A * | 12/1990 | Barr | 367/24 |
| 4,992,992 A | 2/1991 | Dragoset, Jr. | |
| 5,257,241 A | 10/1993 | Henderson et al. | |
| 5,930,731 A | 7/1999 | Brzostowski | |
| 5,959,938 A | 9/1999 | Behrens | |
| 6,024,344 A | 2/2000 | Buckley et al. | |
| 6,049,507 A | 4/2000 | Allen | |
| 6,088,299 A | 7/2000 | Erath et al. | |
| 6,317,695 B1 | 11/2001 | Zhou et al. | |
| 6,456,565 B1 | 9/2002 | Grall et al. | |
| 6,574,567 B2 | 6/2003 | Martinez | |
| 6,754,590 B1 | 6/2004 | Moldoveanu | |
| 6,775,618 B1 | 8/2004 | Robertsson et al. | |
| 7,372,769 B2 * | 5/2008 | Grion | 367/24 |
| 7,400,552 B2 | 7/2008 | Moldoveanu et al. | |
| 7,417,924 B2 | 8/2008 | Vigen et al. | |
| 7,599,798 B2 | 10/2009 | Beasley et al. | |
| 7,660,189 B2 | 2/2010 | Vigen et al. | |
| 2005/0027454 A1 | 2/2005 | Vaage et al. | |
| 2006/0239122 A1 | 10/2006 | Vigen et al. | |
| 2007/0165486 A1 | 7/2007 | Moldoveanu et al. | |
| 2007/0189374 A1 | 8/2007 | Comparsi De Castro et al. | |
| 2008/0253225 A1 | 10/2008 | Welker et al. | |
| 2008/0279045 A1 | 11/2008 | Vigen et al. | |
| 2008/0300821 A1 | 12/2008 | Frank et al. | |
| 2009/0161488 A1 | 6/2009 | Ferber et al. | |
| 2009/0175124 A1 | 7/2009 | Sorli | |
| 2009/0231953 A1 | 9/2009 | Welker et al. | |
| 2009/0323467 A1 | 12/2009 | Goujon et al. | |
| 2010/0002537 A1 | 1/2010 | Welker | |
| 2010/0054082 A1 | 3/2010 | McGarry et al. | |
| 2010/0135112 A1 | 6/2010 | Robertsson | |
| 2011/0176384 A1 | 7/2011 | Soubaras | |
| 2011/0305109 A1 | 12/2011 | Soubaras | |
| 2012/0092956 A1 | 4/2012 | Soubaras | |
| 2012/0213033 A1 | 8/2012 | Soubaras | |
| 2012/0218858 A1 | 8/2012 | Soubaras | |
| 2012/0218859 A1 | 8/2012 | Soubaras | |

FOREIGN PATENT DOCUMENTS

| | | |
|---|---|---|
| EP | 2352040 A2 | 8/2011 |
| FR | 2955396 A1 | 7/2011 |
| FR | 2961316 A1 | 12/2011 |
| GB | 1588462 | 4/1981 |
| GB | 2425839 A | 11/2006 |
| WO | 2007006785 A2 | 1/2007 |
| WO | 2011086166 A1 | 7/2011 |

OTHER PUBLICATIONS

Dan Ebrom et al.; Facilitating Technologies for Permanently Instrumented Oil Fields; The Leading Edge; vol. 19, No. 3; Mar. 2000; XP002590895; pp. 282-285.

International Search Report mailed on Sep. 10, 2010 and issued in application No. PCT/EP2010/058174.

French Preliminary Search Report mailed on Jul. 8, 2010 and issued in French Application No. 1050278.

French Opinion mailed on Jul. 8, 2010 and issued in French Application No. 1050278.

Jim Leinbach; "Wiener Spiking Deconvolution and Minimum-phase Wavelets: a Tutorial", The Leading Edge, vol. 14, No. 3 pp. 189-192, Mar. 1995.

Robert Soubaras, "Veriable-depth streamer: deep towing and efficient deghosting for extended bad with" Aug. 2010.

Robert Soubaras, "Deghosting by joint deconvolution of a migration and a mirror migration" Aug. 2010, SEG Denver 2010 Annual Meeting.

International Search Report mailed on Sep. 19, 2011 and issued in application No. PCT/EP2011/059528.

Written Opinion of the International Search Authority mailed on Sep. 19, 2011 and issued in application No. PCT/EP2011/059528.

Daniel Trad Interpolation and multiple attenuation with migration operators' Geophysics, SEG, vol. 68, No. 6, Nov.-Dec. 2003, pp. 2043-2054.

International Search Report mailed on Apr. 21, 2011 and issued in application No. PCT/EP2011/050480.

U.S. Office Action dated Jul. 5, 2012, issued in related U.S. Appl. No. 13/272,149.

International Search Report mailed on Aug. 31, 2012 in related application No. PCT/EP2011/068031.

US Office Action mailed on Aug. 8, 2012 in related U.S. Appl. No. 13/008,099.

US Office Action mailed on Aug. 3, 2012 in related U.S. Appl. No. 13/464,109.

US Office Action mailed on Aug. 17, 2012 in related U.S. Appl. No. 13/155,778.

US Office Action mailed on Aug. 15, 2012 in related U.S. Appl. No. 13/464,126.

GB Search Report mailed on Nov. 11, 2011 in related Application No. GB1117501.5.

R. Soubaras, et al.; "Variable Depth Streamer Acquisition: Enhancing Interpretation with broadband marine seismic"; GeoConvention 2012; May 2012, Vision.

M. Wong, et al.; "Least-squares Reverse Time Migration/Inversion For Ocean Bottom Data; a Case Study"; 2011 SEG Annual Meeting; Sep. 18-23, 2011 , San Antonio, Texas.

M. Wong, et al.; "Joint least—squares inversion of up—and down—going signal for ocean bottom data sets"; SEG Technical Program Expanded Abstracts 2010; Oct. 17-22, 2010 , Denver, Colorado; pp. 2752-2756.

U.S. Office Action issued on Jan. 7, 2013 in related U.S. Appl. No. 13/464,149.

U.S. Office Action issued on Dec. 6, 2012 in related U.S. Appl. No. 13/155,778.

U.S. Office Action issued on Dec. 6, 2012 in related U.S. Appl. No. 13/464,126.

U.S. Final Office Action issued Feb. 4, 2013 in related U.S. Appl. No. 13/464,109.

* cited by examiner

METHOD AND DEVICE TO ACQUIRE MARINE SEISMIC DATA

CROSS REFERENCE TO RELATED APPLICATIONS

This application is a Continuation of copending PCT International Application No. PCT/EP2011/050480 filed on Jan. 11, 2011, which designated the United States, and on which priority is claimed under 35 U.S.C. §120. This application also claims priority under 35 U.S.C. §119(a) on Patent Application No. 1050276 filed in France on Jan. 15, 2010. The entire contents of each of the above documents is hereby incorporated by reference into the present application.

DESCRIPTION

The present invention relates to the gathering of marine seismic data.

More particularly it concerns a method and device for marine seismic acquisition, capable of producing data which can be processed for the elimination of ghost signals.

A ghost is a parasitic signal due to reflections of the seismic waves at the water-air interface formed by the surface of the water.

STATE OF THE ART

During seismic surveys, the purpose is to permit the locating of seismic reflectors located at different depths under the seafloor. Reflectors may lie at shallow depths (so-called shallow events), at medium or large depth (so-called deep events).

One widespread technique used for oil or gas prospecting consists of conducting a seismic survey of the subsurface. To image the structure of the subsurface, geophysicians use "seismic-reflection" techniques.

In marine seismics, the conventional technique consists of towing behind a vessel:
one or more energy sources for the emission of acoustic waves, and
seismic receivers arranged on cables called streamers positioned horizontally at a constant depth $\Delta z$ to record the acoustic wave reflected by the interfaces between geological formations.

The source transmits an acoustic wave to the water, by setting up a wave field (compression waves) which propagates coherently and downwardly (downward propagation) into the subsurface. When the wave field strikes an interface between formations, called reflectors, it is reflected through the sub-surface and water as far as the seismic receivers (upward propagation) where it is converted into electric signals and recorded.

Seismic receivers are arranged so that the recorded signals, called traces, form seismic data which can be used to construct an image of the geological layers.

One problem that is encountered is reverberation, and can be explained as follows. A seismic wave reflected by a reflector passes through the water in a generally upward direction. This wave which is called the "primary" propagates in the water and passes through the seismic receiver which records its presence.

The wave field continues its progression towards the surface of the water (whose reflection coefficient is −1) where it is reflected downwards. This reflected wave field or "ghost" is also propagated in the water and passes through the receivers where it is recorded once again with reverse polarity and a time lag $\Delta t$ which, for waves propagating vertically, is:

$$\Delta t = 2\Delta z/c$$

in which:
$\Delta t$: the time difference between the recording of the primary wave and ghost respectively by the receiver,
$\Delta z$: the distance between the streamer and the water surface,
c: the rate of propagation of the wave in water (namely 1500 m/s).

This reverberation of the seismic wave field in the water affects seismic data by amplifying some frequencies and by attenuating others, which makes reflector location difficult.

In the spectral domain, the ghost corresponds to a filter transfer function:

$$G(f) = 1 - \exp(2j\pi f \Delta t)$$

This transfer function G(f) is zero for multiple frequencies f of $f_n$ in which $$f_n = \frac{1}{\Delta t} = \frac{c/2}{\Delta z} = \frac{750}{\Delta z}$$

These frequencies for which a transfer function is zero are called "notches". Notches are a particular hindrance since they cannot be deconvoluted.

In the 1980s, data gathering techniques using slanted streamers were proposed. Said techniques are notably described in documents U.S. Pat. No. 4,353,121 and U.S. Pat. No. 4,992,992.

In the first document, a seismic streamer of length 1.2 km is used, having an angle in the order of 2 degrees with the surface of the water.

With this configuration, it is the operation of data stacking which ensures the elimination of ghosts. The acquired data is effectively redundant, and the processing method comprises a data stacking step. The recordings contributing towards this stack, which were recorded by different receivers, display notches at different frequencies, so that the information that is missing due to the presence of a notch on one seismic receiver is obtained from another receiver.

A device using a seismic streamer 1 km in length has a limited exploration depth owing to its length, and does not enable the location of seismic reflectors lying several kilometres deep.

The streamers currently used in 3D marine seismic surveys, adapted to locate deep reflectors, generally have a length in the order of 6 to 10 kilometres. The principle of a slanted streamer proposed in the above-cited patents cannot be applied to them since, with an angle of 2 degrees, this would lead to a maximum depth of 280 m, whereas in practice a depth of 50 m is considered to be a maximum. On this account, this principle has not been used since the end of the 1980s.

Since the 1990s interest has focused geological structures at deeper depth.

To locate deep reflectors, high frequency acoustic waves are not suitable on account of the high attenuation they undergo during their propagation.

So as to maintain a bandwidth at large depth, comprising a sufficient number of octaves which is the necessary condition for a good image, an octave must be gained in the low frequencies thereby increasing the conventional bandwidth of 3 octaves 5-40 Hz to a bandwidth of 2.5-20 Hz for example. To do so, it is possible to increase the depth of the streamer. However, it is not sufficient to give priority to low frequencies since high frequencies are needed to estimate precisely the velocity model of the surface layers.

The signal-to-noise ratio must therefore be improved for low frequency acoustic waves, without this ratio being deteriorated for the high frequency acoustic waves.

One purpose of the present invention is to propose a technique to acquire marine seismic data which has broad dynamics with respect to the depth of the reflectors able to be located, and which is simple and efficient with respect to operations and economics.

PRESENTATION OF THE INVENTION

According to the invention, there is provided a seismic wave acquisition method comprising:
  towing with a vessel at least one streamer comprising a plurality of seismic receivers, said streamer being equipped with a plurality of birds controlling its depth in the water, said birds being spaced apart along its length,
  individually adjusting said birds starting from the head of the streamer such that the streamer comprises a head portion having a first slope in which the depth of the receivers increases the further their distance from the vessel, and a tail portion comprising at least one section having a second slope different to the first slope,
  recording seismic waves with the plurality of seismic receivers while towing the cable.

The invention also concerns a method of acquiring seismic waves, the method comprising:
  towing with a vessel at least one streamer comprising a plurality of seismic receivers, said streamer being equipped with a plurality of birds controlling its depth in the water, said birds being spaced apart along its length and
  individually adjusting said birds starting from the head of the streamer, such that the depth of the receivers increases the further their distance from the vessel, and the streamer comprises at least two portions with different slopes.

The invention also concerns a device to acquire seismic waves towed by a vessel and including at least one streamer comprising a plurality of seismic receivers and equipped with depth controllers spaced apart along its length, wherein said controllers are adjusted so that, in the head portion of the streamer, the depth of the receivers increases the further they lie distant from the vessel, the streamer having a first slope relative to the surface of the water, and its tail portion comprises at least one section having a second slope different to the first slope.

PRESENTATION OF THE FIGURES

Other characteristics and advantages of the invention will become further apparent from the following description which is solely illustrative and non-limiting, and is to be read with reference to the appended drawings in which:
FIGS. 1' and 2' illustrate spectra of a shallow event, obtained using the devices illustrated FIGS. 1 and 2;
FIGS. 3' and 4' illustrate spectra of a shallow event obtained using the devices illustrated FIGS. 3 and 4.

DETAILED DESCRIPTION OF EMBODIMENTS

Figure 1:
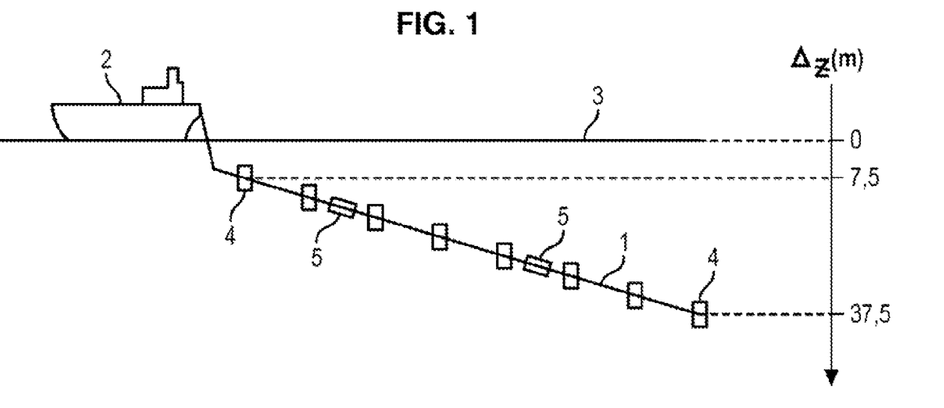
FIGS. 1 and 2 illustrate acquisition devices belonging to the prior art.

With reference to FIG. 1, a prior art acquisition device is illustrated comprising a seismic streamer towed by a vessel 2. The streamer 1 comprises a plurality of receivers 4a, 4b spaced at regular intervals in the order of a few meters along the streamer. The receivers are usually hydrophones. The streamer 1 is also equipped, as is conventional, with depth control units called birds 5 mounted on the streamer at regular intervals e.g. at around 300 meters from each other. Said depth control birds are commercially available. Each of the birds 5 can be individually adjusted to position the streamer at a determined depth.

In the device shown FIG. 1, the devices 5 are adjusted at increasing depths starting from the head of the streamer 1, so that the streamer 1 is slanted relative to the surface of the water 3. The seismic receiver 4a the closest to the vessel 2 is positioned at a depth of 7.5 meters, and the seismic receiver 4b lying furthest distant from the vessel 2 (at a horizontal distance which generally lies between 6 and 10 km in currently used acquisition devices) lies at a depth of 37.5 meters. It is noted in FIG. 1, as in the other figures, that the representation of the slant is highly exaggerated compared with reality.

Two spectra 10, 20 of final images (after stacking) of a shallow reflector (depth 800 meters) are illustrated FIG. 1'.

The first spectrum 10 (called "ideal spectrum" in the remainder hereof) is obtained when modelling does not include any ghost. It is therefore the ideal spectrum which would be obtained if the parasitic ghost signal was fully eliminated in the signals recorded by the hydrophones (traces).

The second spectrum 20 (called "effective spectrum" in the remainder hereof) is obtained using the device illustrated FIG. 1.

It is ascertained that these two spectra have very different shapes. In particular, the width of the effective spectrum 20 is smaller than the width of the ideal spectrum 10: the effective spectrum 20 contains less energy for the low frequencies (lower than 10 Hz) and high frequencies (higher than 60 Hz) than the ideal spectrum 10.

Yet it is precisely within these frequency bands that the signal-to-noise ratio is to be improved.

Figure 2:
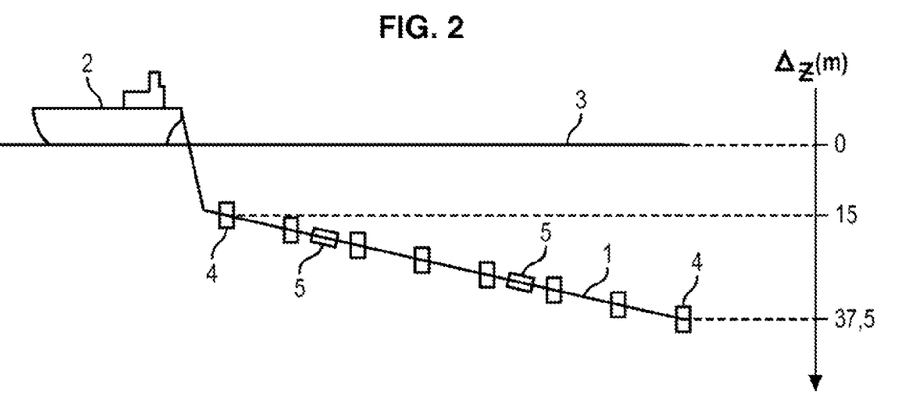

With reference to FIG. 2, another acquisition device is illustrated comprising a streamer 1 towed by a vessel 2. The depth control birds 5 equipping the streamer are adjusted so that the streamer 1 is slanted with respect to the surface of the water 3. This time, the seismic receiver 4a closest to the vessel 2 is located at a depth of 15 meters and the seismic receiver 4b the furthest distant from the vessel 2 (at a horizontal distance of 8 km or more) lies at a depth of 37.5 meters.

Therefore, the only difference compared with the device in FIG. 1 concerns the depth of the seismic receiver the closest to the vessel.

The advantage of increasing the depth of the seismic receiver the closest to the vessel is to minimize the effect of swell noise which only affects areas close to the surface.

The spectra 10, 20 of final images (after stacking) of the same shallow reflector (depth 800 meters) are illustrated FIG. 2'.

The ideal spectrum 10 is obtained when modelling does not include any ghost. The effective spectrum 20 is obtained using the device illustrated FIG. 2.

Here again it is ascertained that these two spectra have very different shapes, the effective spectrum 20 containing the notch of a receiver at 15 m, lying at 50 Hz, this notch still being present though in attenuated form.

The imperfect ghost elimination obtained using the acquisition devices illustrated FIGS. 1 and 2 is related to the depth of the reflector under consideration (800 meters).

For a reflector at this depth, the data recorded by the receivers relatively close to the seismic source have an overriding influence in stacking, the distant receivers making a negligible contribution.

Therefore, for a shallow reflector, only the recordings of the seismic receivers positioned in the head portion of the streamer (the closest to the vessel) are used.

For the devices illustrated FIGS. 1 and 2, this means that the depth dynamics of the receivers, which determine the diversity of the notches, are insufficient for good quality ghost elimination when processing.

Figure 3:
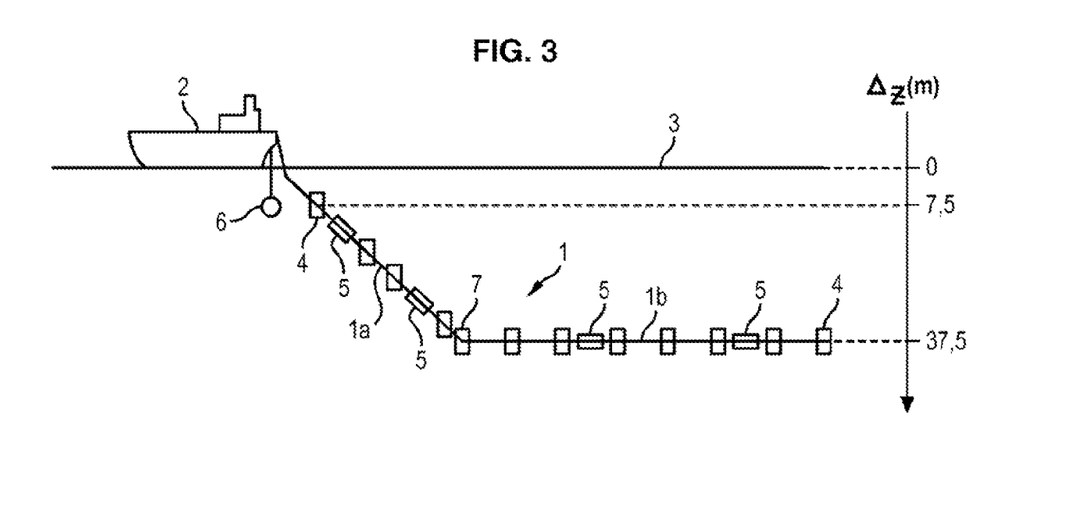
FIGS. 3 and 4 illustrate two embodiments of an acquisition device according to the invention.
Figure 4:
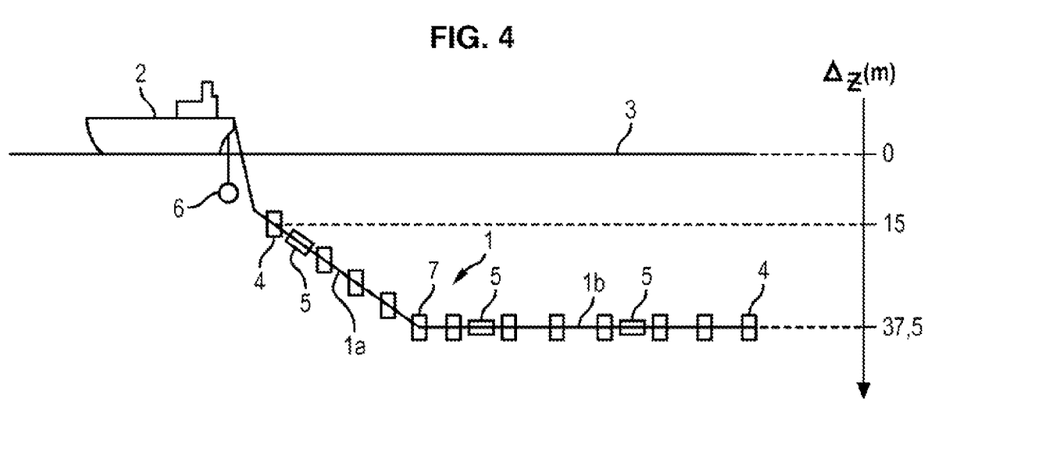
Figure 5:
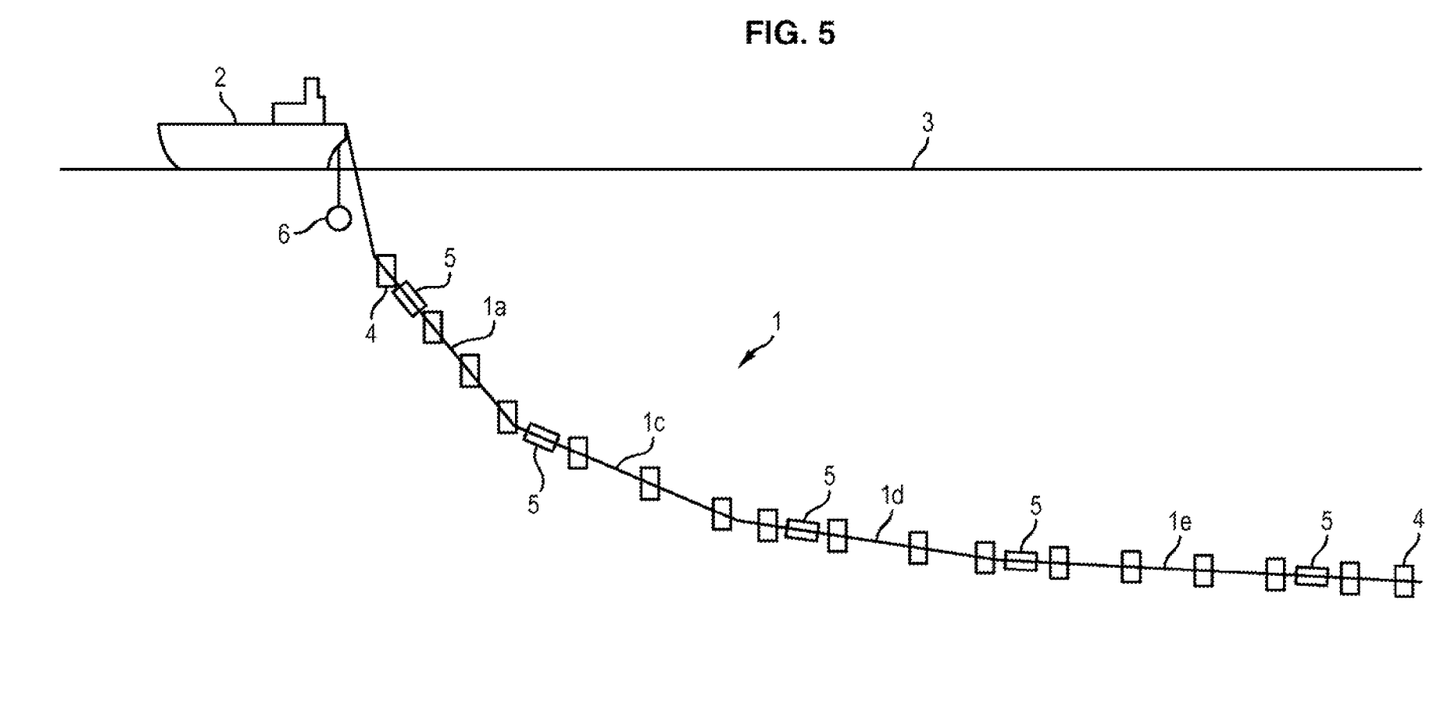
FIG. 5 illustrates another embodiment of the acquisition device according to the invention.

With reference to FIGS. 3, 4 and 5, different embodiments of the invention are illustrated. For reasons of simplicity, these figures show only one seismic streamer 1, but in practice current seismic data gathering devices comprise a plurality of streamers 1 (eight, ten or more) towed by the vessel 2, and the invention is applicable irrespective of the number of streamers towed by the vessel.

Each streamer 1 comprises a plurality of seismic receivers 4, typically hydrophones which produce signals when they receive marine seismic waves emitted by an emission source 6 towed by the vessel 2, and activated at regular intervals (represented as a point source but in practice consisting of several parallel lines of air guns), and further comprises depth control birds 5. The streamers are appropriately solid streamers marketed by Sercel under the trademark Sentinel, but the invention is applicable to other types of streamers. The depth control birds can appropriately be devices of Nautilus type (trademark registered by Sercel) which also permit lateral positioning of the streamers, but once again other types of depth control devices can be used to implement the invention. The distances between adjacent receivers 4 are in the order of a few meters, and appropriately the distances between adjacent depth control birds are between 200 and 400 meters.

As known per se means are provided, which are not shown, to determine the position coordinates of the source 6 and receivers 4 on each shot fired by the source 6.

Each streamer 1 comprises a head portion 1a and a tail portion 1b. Each portion comprises a plurality of seismic receivers 4. The depth control birds 5 of the head portion 1a are adjusted for respective depths which increase the further they lie distant from the vessel, so that portion 1a lies at a slant angle relative to the surface of the water 3. In the embodiments illustrated FIGS. 3 and 4, the depth control birds 5 of the tail portion 1b are adjusted uniformly so that portion 1b lies horizontal, in other words its slant angle is zero.

These different configurations allow sufficient notch dynamics to be obtained for shallow reflectors, using receivers lying at depths that are acceptable in practice.

In the embodiment shown FIG. 3, the seismic receiver the closest to the seismic source 6 lies at a depth of 7.5 meters. The head portion 1a appropriately has a length of between 1 and 3 km, for example of 2 km. The seismic receiver 4 of the first portion 1a that is furthest distant from the seismic source 6 lies at a depth of 37.5 meters. The second portion 1b being horizontal, the receiver 4 of the second portion 1b the furthest distant from the source 6 also lies at a depth of 37.5 meters. Evidently this value is only given by way of illustration. The depth can be chosen in each case in relation to particular conditions (depth of the water section, geological characteristics).

FIG. 3' illustrates two spectra 10, 20 of final images (after stacking) of a shallow reflector (depth of 800 meters).

The first spectrum 10 ("ideal spectrum") is obtained when modelling does not include any ghost. It is therefore the ideal spectrum which would be obtained if the parasitic ghost signal was fully eliminated from the signals recorded by the hydrophones (traces).

The second spectrum 20 ("effective spectrum") is obtained using the device illustrated FIG. 3.

It is found that elimination of the ghost is indeed obtained, since the effective spectrum 20 follows the ideal spectrum 10. In particular, the effective spectrum 20 has the same behaviour as the ideal spectrum for the low frequencies and high frequencies.

FIG. 4 illustrates an embodiment which differs from the one in FIG. 3 through the depth of the seismic receiver the closest to the seismic source. In the case shown FIG. 4 this receiver lies at a depth of 15 meters.

FIG. 4' illustrates the spectra of final images (after stacking) of the same shallow reflector, obtained from the device in FIG. 4, for the ideal case and for the effective case.

By comparing the ideal spectrum 10 and the effective spectrum 20, it is verified that ghost elimination has been properly obtained, that the behaviour of the effective spectrum 20 in the low and high frequencies is similar to that of the ideal spectrum 10, and that the notch at 50 Hz is suitably filled.

To pay heed to hydrodynamic considerations, the slant of head portion 1a is preferably less than 2%. This avoids setting up turbulence which would be detrimental to the quality of the signals recorded by the seismic receivers. This slant is preferably more than 1% which provides a sufficient range of receiver depths to achieve good quality ghost elimination when processing.

With reference to FIG. 5 another embodiment is illustrated in which the depth control birds 5 are adjusted so that the tail portion 1b of the streamer 1, on and after the junction with the head portion, comprises a section 1c of smaller slant than the head portion 1a, a section 1d having a slant smaller than that of section 1c and a section 1e having a smaller slant than section 1d. In this embodiment, the seismic receiver the closest to the surface of the water lies at a depth of between 7 meters and 8 meters. According to one variant of embodiment, section 1e may be horizontal i.e. have a zero slant. According to another variant, sections 1d and 1e form a single section of uniform slant.

It will be understood that for achieving the depth variation of the receivers in accordance with the invention, it is sufficient if the slant of a streamer section as referred to above is an average over the section in question. The slope angle within a streamer section is not required to be strictly constant.

Processing Method

Under the present invention, the seismic data are recorded by receivers located at different depths. The methods to process marine seismic data are generally adapted to receivers which all lie at one same depth.

The operation of "datuming" consists of using recorded data to construct data which would have been obtained if the receivers had been at the same depth. The method to process data derived from a slanted streamer described in U.S. Pat. No. 4,353,121 comprises a 1D datuming step which assumes that wave propagation is vertical. U.S. Pat. No. 4,992,992 replaces the 1D datuming of U.S. Pat. No. 4,353,121 by 2D datuming, which takes into account the angle of propagation in the direction of the streamer, implicitly assuming that propagation occurs in the vertical plane passing through the streamer. Additionally, it is limited to the case in which the streamer has a constant slant angle.

Three-dimensional generalisation of the method described in U.S. Pat. No. 4,992,992, replacing 2D datuming by 3D datuming, comes up against y-sampling restrictions of current 3D geometries: modern acquisition geometries have several streamers which sample dimension y, but the sampling pitch (cross distance between 2 streamers) is in the order of 150 m, an order of magnitude that is larger than the distance between 2 consecutive receivers on a streamer (12.5 m).

It is inferred that the methods described in U.S. Pat. No. 4,353,121 and U.S. Pat. No. 4,992,992 are not applicable to an acquisition geometry corresponding to the embodiments of the invention described above.

The processing method given below can be used to obtain an image directly of the subsurface, using data derived from the above-described 3D acquisition taking into account non-vertical directions of propagation.

This method comprises receiving the marine seismic data derived from 3D acquisition, 3D migration of the seismic data and obtaining an image representing the topography of the subsurface.

3D migration per shot point is a modern method to process seismic data, which allows a precise image of the subsurface to be obtained taking wave propagation accurately into account in complex media.

Said migration consists of synthesizing the incident wave from information on the seismic source and reflected wave using recorded data.

For migration of "one-way" type the principle is the following.

The incident wave D (i.e. the wave emitted by the source) is assumed to be down-travelling. This incident wave D(x,y,z,t) is synthesized recursively at depth z, the down-travelling wave being initialized at the depth of the seismic source $z_s$. The incident wave D at every depth $n\Delta z$ is then calculated recursively by calculating the incident wave at depth $z+\Delta z$ from the incident wave at depth z.

Similarly, the reflected wave U(x,y,z,t) is assumed to be up-travelling and is initialized at $z=z_r$ with the data recorded by the seismic receivers (if all the receivers have the same depth). The reflected wave U in the entire volume is then calculated recursively by calculating the up-travelling wave U at depth $z+\Delta z$ from the up-travelling wave at depth z.

The image of the subsurface is calculated by the time cross-correlation of the two volumes D (x,y,z,t) and U(x,y,z,t).

The altimetry i.e. the fact that the source and the receivers may have non-zero depths (and all different) may be taken into account by adding the sources and receivers as z throughout the recursive calculations: for example a receiver at a depth $z_r$ lying between $n\Delta z$ and $(n+1)\Delta z$ is added during the recursive calculation of $U((n+1)\Delta z)$ from $U(n\Delta z)$.

Also, the migration step is appropriately an adapted mirror migration, so-called by analogy with mirror migration and the adapted filter used for signal processing (consisting of convoluting a measurement s(t), perturbed by convolution with a h(t) filter, by h(−t) so as to optimize the signal-to-noise ratio.

For mirror migration, the sea surface is used as mirror: instead of "sighting" the seafloor, it is the water surface that is "sighted" to see the reflectors located underneath the seismic receivers.

Figure 6:
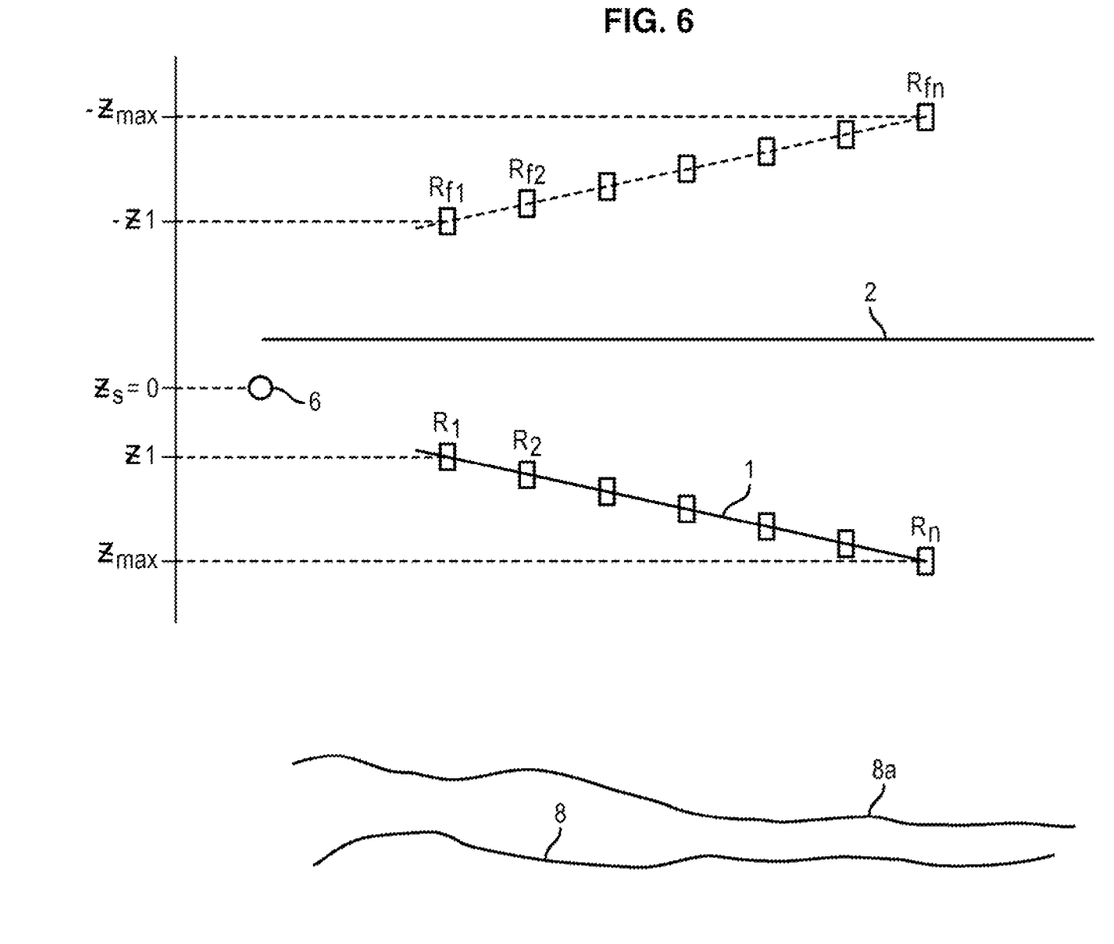
FIG. 6 is a schematic illustrating a method permitting the processing of marine seismic data recorded by the acquisition device of the invention.

In practice, the seismic data are considered not as having been recorded at the seismic receivers of the streamer, but at an altitude above the water surface equal to the depth of the receiver located at the deepest depth, as illustrated FIG. 6.

One mirror imaging technique using mirror migration is described for example in the publication "*Facilitating technologies for permanently instrumented oil fields*" Dan Ebrom, Xiuyuan Li, and Dwight Sukup, The Leading Edge, Vol. 19, N° 3, pp. 282-285, March 2000.

In this publication, this technique is used for data gathering using seismic receivers located on the seafloor 8a. The principle used is the principle of reciprocity, and fictitious consideration is therefore given to sources on the seafloor (at the receiver positions) and of receivers on the surface (at the source positions).

Mirror imaging consists of using the fictitious ghost source to obtain the image, which can be achieved by placing the fictitious sources at their mirror position relative to the water surface, the source positions $(x_s, y_s, z_s)$ being changed to $(x_s, y_s, -z_s)$.

Mirror imaging allows better illumination of shallow reflectors.

With respect to adapted mirror migration, $(x_r, y_r, z_r)$ being the positions of the receivers on the streamers, the reflected wave U (assumed to be up-travelling) is initialized with altimetry migration at an altitude $-z_{max}$, $z_{max}$ being the maximum depth of the seismic receivers (the maximum of all $z_r$) and altitude 0 corresponding to the water surface. Values for the respective positions $x_r$, $y_r$ of the receivers are obtained by the known methods used in conventional marine seismic acquisition by streamers. As for the depth positions $z_r$, a value for each seismic receiver can be determined by linear interpolation between the depth values of the two birds located closest to that receiver on each side of that receiver, which control the depth profile of the streamer in the region of that receiver, on the basis of the distance between these two birds and the distance between that receiver and one of these birds, both distances being known.

During the recursive downward movement of the wave U as z between values $-z_{max}$ and 0, the recording of the receiver under consideration is added with a sign change at the mirror positions of the receivers relative to the seafloor i.e. at $(x_r, y_r, -z_r)$.

Continuing downwards for z=0 to $z_{max}$, the recordings of the receiver under consideration are added at their real positions $(x_r, y_r, z_r)$. The remainder of the recursive calculation of U, the generation of the incident wave D (assumed to be down-travelling) and the cross-correlation step between incident and reflected wave to obtain the image, are conducted in similar manner to a conventional one-way migration.

In this manner, the subsurface image is obtained directly from data acquired using the method of the invention, taking into account the exact receiver positions and the exact 3D propagation of the waves.

The step, during which recordings are added at the mirror positions of the receivers, provides strengthening of the signal-to-noise ratio by imaging based on the ghost receiver, without doubling the migration calculation time which would be the case if two images were calculated and then stacked as proposed in "*Facilitating technologies for permanently instrumented oil fields*". The above-described processing allows an image of the subsurface to be obtained directly from data derived from the 3D acquisition according to the invention.

Contrary to the methods described in U.S. Pat. No. 4,353,121 and U.S. Pat. No. 4,992,992 the processing method described above does not comprise any step consisting of reconstructing seismic data, which would have been recorded by a horizontal streamer, using seismic data recorded by the slanted streamer prior to their migration.

The processing method described above takes into account the angles of propagation at both x and y.

This method also makes it possible to improve the signal-to-noise ratio by using ghost data to reinforce primary reflection data.

If the depth diversity of the sensors does not permit full elimination of ghost waves, the resulting perturbation on end data is convolution by a filter that is symmetrical (zero phase) and can be deconvoluted (no notch). This deconvolution step is simplified by the fact that it is a zero phase deconvolution.

The description of adapted mirror migration given above concerns the case of 3D migration for "one-way" shot point. There are other types of migrations which can be adapted as adapted mirror migration by adding to the calculation of the reflected wave, in addition to recordings of the receivers at their exact positions, the opposite recordings at their mirror positions.

There is also a 3D migration per shot point called "Reverse Time Migration" which does not assume that the incident wave is a down-travelling wave and the reflected wave an up-travelling wave. In this case, the adapted mirror migration can be performed by adding the receivers at their effective position ($x_r$, $y_r$, $z_r$) but by using at the water surface so-called free-surface boundary conditions instead of the usually used absorbing boundary conditions.

In the embodiments described above, the seismic receivers of the streamers are hydrophones. The acquisition geometries described can also be applied when the streamers comprise in combination hydrophones sensitive to pressure, and receivers sensitive to displacement, such as geophones or accelerometers.

In such a case, the adapted mirror migration processing described above can also be used, keeping in mind that this processing has to be achieved separately for each type of receiver.

Moreover, the sign change has not to be applied to the records of vertical geophones but only to horizontal geophones. The results obtained in this way can be combined using a calibration operator, tool known by the man skilled in the art.

The invention claimed is:

1. A method for acquiring seismic waves in water, the method comprising:
    towing with a vessel at least one streamer including a plurality of seismic receivers, said at least one streamer being equipped with a plurality of birds for controlling its depth in the water, said plurality of birds being spaced apart along a length of the at least one streamer;
    adjusting a first set of the plurality of birds such that the streamer comprises a straight line head portion having a first slope in which a depth of the receivers increases with a distance of the receivers from the vessel;
    adjusting a second set of the plurality of birds such that the streamer comprises a tail portion including at least one straight line section having a second slope different from the first slope, wherein the tail portion comprises at least first and second sections having receivers with a depth that increases with the distance from the vessel, the first section being closest to the vessel and having a slant greater than that of the second section laving furthest from the vessel; and
    recording the seismic waves, which are reflected and/or refracted by a subsurface to be surveyed, with the plurality of seismic receivers while towing the at least one streamer with the straight line head portion having the first slope and the at least one straight line section of the tail portion having the second slope,
    wherein the plurality of receivers are distributed on both the head portion and the tail portion.

2. The method according to claim 1, wherein the straight line head portion is tilted relative to a horizontal line with a slant between 1 and 2%.

3. The method according to claim 1, wherein the straight line head portion has a length of between 1 and 3 km.

4. The method according to claim 1, wherein a seismic receiver closest to a surface of the water lies at a depth of between 7 m and 8 m.

5. The method according to claim 1, wherein the plurality of seismic receivers of the at least one streamer include hydrophones.

6. The method according to claim 1, wherein the plurality of seismic receivers of the at least one streamer comprise a combination of hydrophones and geophones.

7. A method of acquiring seismic waves in water, the method comprising:
    towing with a vessel at least one streamer comprising a plurality of seismic receivers, the at least one streamer being equipped with a plurality of birds that are configured to control their depths in the water, the plurality of birds being spaced apart along a length of the at least one streamer; and
    individually adjusting the plurality of birds, starting from a head of the at least one streamer, such that depths of the receivers increase with a distance from the vessel and the at least one streamer comprises at least first and second straight line portions with different slopes, each of the first and second portions including corresponding receivers and birds,
    wherein the second straight line portion comprises at least first and second sections having receivers with a depth that increases with the distance from the vessel, the first section being closest to the vessel and having a slant greater than that of the second section laving furthest from the vessel, and
    wherein the receivers record seismic waves, reflected and/or refracted by a subsurface to be surveyed, while the first and second straight line portions have the different slopes.

8. The method according to claim 7, wherein the first portion is tilted relative to a horizontal line with a slant between 1 and 2%.

9. The method according to claim 8, wherein the first portion has a length of between 1 and 3 km.

10. The method according to claim 9, wherein a seismic receiver closest to a surface of the water on the first portion lays at a depth of between 7 m and 8 m.

11. A seismic system configured to acquire seismic waves related to a subsurface to be surveyed, the system comprising:
    at least one seismic source towed by, but not directly attached to, a vessel and configured to emit the seismic waves;
    at least one streamer;
    a plurality of seismic receivers distributed along a length of the at least one streamer and configured to record the seismic waves; and
    depth control devices spaced apart along a straight line head portion and a tail portion of the at least one streamer,
    wherein a first set of the depth control devices are adjusted so that in the straight line head portion of the at least one streamer, a depth of first receivers increases the further they lay distant from the vessel, the straight line head portion having a first slope relative to a surface of the water, and a second set of the depth control devices are adjusted so that in the tail portion of the at least one streamer, at least one straight line section has second receivers and the at least one straight line section has a second slope different from the first slope, and wherein the tail portion comprises at least first and second sections having the second receivers with a depth that increases with the distance from the vessel, the first section being closest to the vessel and having a slant greater than that of the second section laving furthest from the vessel.

12. The system according to claim 11, wherein the straight line head portion is tilted relative to a horizontal line with a slant between 1 and 2%.

13. The system according to claim 11, wherein the straight line head portion has a length of between 1 and 3 km.

14. The system according to claim 11, wherein a seismic receiver closest to a surface of the water lays on the straight line head portion at a depth of between 7 m and 8 m.

15. The system according to claim 11, wherein the plurality of seismic receivers of the at least one streamer include hydrophones.

16. The system according to claim 11, wherein the plurality of seismic receivers of the at least one streamer comprise a combination of hydrophones and geophones.

* * * * *

UNITED STATES PATENT AND TRADEMARK OFFICE
CERTIFICATE OF CORRECTION

PATENT NO.        : 8,531,912 B2                                    Page 1 of 1
APPLICATION NO.   : 13/471561
DATED             : September 10, 2013
INVENTOR(S)       : Soubaras It is certified that error appears in the above-identified patent and that said Letters Patent is hereby corrected as shown below:

On Title Page 2, in Item (56), under "OTHER PUBLICATIONS", in Column 2, Line 8, delete ""Veriable-depth" and insert -- "Variable-depth --, therefor.

In the Specification:

In Column 3, Line 67, delete "invention;" and insert -- invention; and --, therefor.

In Column 8, Line 7, delete "N° 3," and insert -- No. 3, --, therefor.

In the Claims:

In Column 9, Line 62, in Claim 1, delete "laving" and insert -- laying --, therefor.

In Column 10, Line 38, in Claim 7, delete "laving" and insert -- laying --, therefor.

In Column 11, Line 11, in Claim 11, delete "laving" and insert -- laying --, therefor.

Signed and Sealed this
Fifth Day of November, 2013

Teresa Stanek Rea
*Deputy Director of the United States Patent and Trademark Office*